(12) United States Patent
Niki et al.

(10) Patent No.: US 6,579,952 B1
(45) Date of Patent: *Jun. 17, 2003

(54) POLYESTERURETHANE ELASTOMERS AND PROCESS FOR THEIR PRODUCTION

(75) Inventors: Akihiro Niki, Kyoto (JP); Hirotake Matsumoto, Osaka (JP); Akihiko Fujiwara, Osaka (JP); Juichi Fukatani, Osaka (JP)

(73) Assignee: Sekisui Chemical Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/647,416

(22) PCT Filed: Mar. 31, 1999

(86) PCT No.: PCT/JP99/01714

§ 371 (c)(1),
(2), (4) Date: Nov. 16, 2000

(87) PCT Pub. No.: WO99/51656

PCT Pub. Date: Oct. 14, 1999

(30) Foreign Application Priority Data

Mar. 31, 1998 (JP) .......................................... 10-086517
May 15, 1998 (JP) .......................................... 10-133756

(51) Int. Cl.⁷ .............................................. C08G 18/42
(52) U.S. Cl. ...................... 525/440; 525/411; 525/438; 525/439; 525/440; 525/444; 528/76; 528/83
(58) Field of Search .............................. 525/440, 438, 525/439; 528/76, 83

(56) References Cited

U.S. PATENT DOCUMENTS 4,182,898 A   1/1980   Fujiwara et al.
4,186,257 A * 1/1980   Blahak ...................... 521/159
4,568,717 A   2/1986   Speranza et al.

FOREIGN PATENT DOCUMENTS

DE   44 29 076 A   2/1996
EP   0 379 149 A   7/1990
EP   0 552 628 A   7/1993

OTHER PUBLICATIONS

Abstract, JP 05 117381A, (May 14, 1993), XP002107871, Section Ch, Week 9324, DATABASE WPI, Derwent Publications Ltd.

* cited by examiner

Primary Examiner—Patricia A. Short
(74) Attorney, Agent, or Firm—Sughrue Mion, PLLC

(57) ABSTRACT

The present invention has for its object to provide an ester elastomer having a high block of the hard and soft segment components, high flexibility, and good mechanical properties at high temperature, particularly high temperature creep resistance and a process for producing said ester elastomer. The present invention relates to an ester elastomer which is a block copolymer comprising a polyester copolymer (A) and a polymer having hydroxyl groups at both terminal ends (B) (hereinafter referred to sometimes as hydroxyl-terminated polymer) coupled to each other through the intermediary of an urethane component (C) consisting in a group of general formula (1);

$$—O—CO—NH—R^1—NH—CO—O— \qquad (1)$$

(wherein $R^1$ represents an alkylene group containing 2 to 15 carbon atoms, $—C_6H_4—$, $—C_6H_4—CH_2—$, $—C_6H_4—CH_2—C_6H_4—$ (where $—C_6H_4—$ represents phenylene)) or a group of general formula (2);

$$—O—CO—NH—R^2—NH—CO— \qquad (2)$$

(wherein $R^2$ represents an alkylene group containing 2 to 15 carbon atoms, $—C_6H_4—$, $—C_6H_4—CH_2—$ or $C_6H_4—CH_2—C_6H_4—$ (wherein $—C_6H_4—$ represents phenylene)).

18 Claims, No Drawings

POLYESTERURETHANE ELASTOMERS AND PROCESS FOR THEIR PRODUCTION

TECHNICAL FIELD

The present invention relates to an ester elastomer having good flexibility and excellent mechanical characteristics at high temperature, particularly excellent creep resistance at high-temperature and a process for its production.

PRIOR ART

With the increased consciousness of ecology, the substitution of recyclable materials for conventional materials is progressing at an accelerated rate in various industries. Thermoplastic elastomers (TPE) have attracted attention as recyclable rubbery materials for many years but as the concept of eco-friendliness is given greater emphasis of late, those materials have come to be used more and more frequently in many applications in automotive and other industries.

Among thermoplastic elastomers, polyester elastomers (hereinafter referred to as TPEE) are outstanding in mechanical strength, heat resistance, wear resistance, and flexural fatigue resistance so that they are broadly used in various industries, particularly in automotive industry. However, TPEE has the disadvantage of (1) high hardness beyond the usual rubber hardness region and, hence, low flexibility and (2) large compressive set at large deformation and/or high temperature and consequent lack of creep resistance. As such, improvements in these aspects have been demanded.

In order to impart flexibility to TPEE, it is necessary to reduce the proportion of the hard segment component which is to shoulder physical crosslinking and a technology for decreasing the hard segment component has been proposed in Japanese Kokai Publication Hei-2-88632, for instance. However, the application of the technique leads to a reduction in the block property of the hard segment component, with the result that the melting point of the resin is depressed and the mechanical properties at high temperature are also sacrificed. With regard to creep resistance, too, a technology for increasing the degree of polymerization to improve the creep resistance has been disclosed in Japanese Kokai Publication Sho-52-121699, for instance, but the consequent improvements in mechanical characteristics are limited and it was also difficult to reconcile creep resistance with flexibility.

SUMMARY OF THE INVENTION

The present invention has for its object to provide an ester elastomer having a high block of the hard and soft segment components, high flexibility, and good mechanical properties at high temperature, particularly high temperature creep resistance and a process for producing said ester elastomer.

The present invention, in a first aspect, relates to an ester elastomer which comprises a block copolymer comprising a polyester copolymer (A) and a polymer having hydroxyl groups at both terminal ends (B) (hereinafter referred to sometimes as hydroxyl-terminated polymer) which are coupled to each other through the intermediary of an urethane component (C) containing a group of general formula (1);

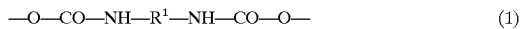

(wherein $R^1$ represents an alkylene group containing 2 to 15 carbon atoms, $-C_6H_4-$, $-C_6H_4-CH_2-$, $-C_6H_4-CH_2-C_6H_4-$ (where $-C_6H_4-$ represents phenylene)) and/or a group of general formula (2);

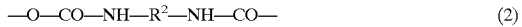

(wherein $R^2$ represents an alkylene group containing 2 to 15 carbon atoms, $-C_6H_4-$, $-C_6H_4-CH_2-$ or $-C_6H_4-CH_2-C_6H_4-$ (wherein $-C_6H_4-$ represents phenylene)), where said polyester copolymer (A) consisting of 50 to 95 weight % of a short-chain polyester component (a1) comprising a group of general formula (3);

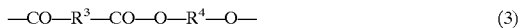

(wherein $R^3$ represents a bivalent aromatic hydrocarbon group containing 6 to 12 carbon atoms; $R^4$ represents an alkylene group containing 2 to 8 carbon atoms) as a recurring unit and 50 to 5 weight % of a long-chain polyester component (a2) comprising a group of general formula (4);

(wherein $R^5$ represents a bivalent aromatic hydrocarbon group containing 6 to 12 carbon atoms; L represents an oligomer component (L) having a glass transition temperature of not higher than 20° C. and a number average molecular weight of 500 to 5000) as a recurring unit, said hydroxyl-terminated polymer (B) having a glass transition temperature of not higher than 20° C., a number average molecular weight of 500 to 5000, and the absolute difference $|\delta B - \delta L|$ [where $\delta B$ represents the solubility parameter of said hydroxyl-terminated polymer (B) and $\delta L$ represents the solubility parameter of said oligomer component (L) of said long-chain polyester component (a2)] being not greater than 0.5.

The present invention, in a second aspect, relates to a process for producing an ester elastomer which comprises melt kneading 100 parts by weight of the polyester copolymer (A) comprising 50 to 95 weight % of the short-chain polyester component (a1) and 50 to 5 weight % of the long-chain polyester component (a2), said long-chain polyester component (a2) containing the oligomer component (L) having a glass transition temperature of not higher than 20° C. and a number average molecular weight of 500 to 5000, 50 to 500 parts by weight of the hydroxyl-terminated polymer (B) having a glass transition temperature of not higher than 20° C. and a number average molecular weight of 500 to 5000, the absolute difference $|\delta B - \delta L|$ ([where $\delta B$ represents the solubility parameter of said hydroxyl-terminated polymer (B) and $\delta L$ represents the solubility parameter of said oligomer component (L) of said long-chain polyester component (a2)] being not greater than 0.5, and 10 to 100 parts by weight of the isocyanate compound (C').

The present invention, in a third aspect, relates to an ester elastomer having a surface hardness of 60 to 90 and a 72-hour compressive set at 120° C. of not greater than 90%.

DETAILED DESCRIPTION OF THE INVENTION

The present invention is now described in detail.

Referring to the first aspect of the invention, the polyester copolymer (A) comprises of 50 to 95 weight % of a short-chain polyester component (a1) of the general formula (3) shown above and 50 to 5 weight % of a long-chain polyester component (a2) of the general formula (4) shown above.

The above polyester copolymer (A) generally consists of recurring units of short-chain polyester component (a1) and long-chain polyester component (a2).

In the above general formula (3) representing said short-chain polyester component (a1), $R^3$ represents a bivalent aromatic hydrocarbon group containing 6 to 12 carbon atoms and $R^4$ represents an alkylene group containing 2 to 8 carbon atoms.

Preferably said short-chain polyester component (a1) may for example be polybutylene terephthalate, polybutylene 2,6-naphthalate, or polyethylene 2,6-naphthalate, for those compounds contribute to the formation of ester elastomers having satisfactory creep resistance at high temperature. Particularly when polybutylene 2,6-naphthalate or polyethylene 2,6-naphthalate is used, a remarkable improvement is obtained in creep resistance at high temperature.

The long-chain polyester component (a2) is represented by general formula (4), and contains said oligomer component (L) having a glass transition temperature of not higher than 20° C. and a number average molecular weight of 500 to 5000 as a constituent unit. In the above general formula (4), $R^5$ represents a bivalent aromatic hydrocarbon group of 6 to 12 carbon atoms.

The oligomer component (L) mentioned above, when it exists as an independent substance, has hydroxyl groups at both termini thereof, and in the long-chain polyester component (a2), each of the two termini is in the form of an ester bond. This oligomer component (L) may for example be a polyether, aliphatic polyester, polylactone, polycarbonate, polyolefin, polybutadiene, polyisoprene, polyacrylate, polysiloxane, and other compounds which have hydroxyl groups at both termini. Among the above-mentioned oligomers, the polyether, aliphatic polyester, polylactone and polycarbonate are preferred because of high reactivity.

When the oligomer component (L) has a glass transition temperature over 20° C., the decrease in the compatibility of the oligomer with the hydroxyl-terminated polymer (B) prevents the ester elastomer from attaining a sufficiently high degree of polymerization so that the strength of the elastomer may not be sufficient. The glass transition temperature is preferably not over 0° C. and more preferably not higher than −20° C.

When the oligomer component (L) has a number average molecular weight of less than 500, the block property of the polyester copolymer (A) is so low as to cause melting point depression, so that the mechanical strength of the ester elastomer will become insufficient. If 5000 is exceeded, the decrease in compatibility with the hydroxyl-terminated polymer (B) will prevent the ester elastomer from attaining a sufficient degree of polymerization so that the strength of the elastomer will be insufficient. The preferred range is 500 to 2000.

When the proportion of the short-chain polyester component (a1) is smaller than 50 weight %, the melting point of the polyester copolymer (A) is depressed to adversely affect the mechanical strength at high temperature of the ester elastomer. Conversely when said proportion exceeds 95 weight %, the resulting decrease in the compatibility with hydroxyl-terminated polymer (B) prevents the ester elastomer from attaining a sufficiently high degree of polymerization so that the strength of the elastomer will be insufficient. The preferred proportion of (a1) is 70 to 90 weight %.

The polyester copolymer (A) mentioned above can be obtained by reacting an aromatic dicarboxylic acid or an ester thereof, a low molecular weight diol, and said oligomer component (L). The oligomer component (L) forms said oligomer component (L) by the above reaction.

The aromatic dicarboxylic acid mentioned above includes but is not limited to terephthalic acid, isophthalic acid, orthophthalic acid, naphthalenedicarboxylic acid and p-phenylenedicarboxylic acid. The above-mentioned ester of aromatic dicarboxylic acid includes but is not limited to dimethyl terephthalate, dimethyl isophthalate, dimethyl orthophthalate, dimethyl naphthalenedicarboxylate and dimethyl p-phenylenedicarboxylate.

The low molecular weight diol mentioned above includes but is not limited to ethylene glycol, 1,2-propanediol, 1,3-propanediol, 1,3-butanediol, 1,4-butanediol, neopentyl glycol, 1,5-pentanediol and 1,6-hexanediol. Those diols can be used each independently or in a combination of two or more species.

The polyether (M) for use as said oligomer component (L) is preferably a polyether containing an alkylene group of 2 to 10 carbon atoms as represented by the following general formula (5), $$-R^6-O- \qquad (5)$$

(wherein $R^6$ represents an alkylene group of 2 to 10 carbon atoms). Thus, for example, polyethylene glycol, poly(1,3-propylene glycol), poly(1,2-propylene glycol), poly(tetramethylene glycol) and poly(hexamethylene glycol) can be mentioned. Among these compounds, poly(tetramethylene glycol) is particularly preferred from the standpoint of mechanical characteristics and weather resistance.

As said polyether, commercial products such as PTHF (manufactured by BASF) and PTMG (manufactured by Mitsubishi Chemical) can be used as they are.

The aliphatic polyester (N) for use as said oligomer component (L) is preferably a polyester having an alkylene group of 2 to 10 carbon atoms as represented by the following general formula (6).

$$-R^7-O-CO-R^8-CO-O- \qquad (6)$$

(where $R^7$ and $R^8$ each represents an alkylene group of 2 to 10 carbon atoms)

As said aliphatic polyester, commercial products such as Nippollan 4009, Nippollan 4010, Nippollan 4070 (manufactured by Nippon Polyurethane) can be utilized.

The polylactone (O) for use as said oligomer component (L) is preferably one obtainable by ring-opening polymerization of a lactone containing 3 to 11 carbon atoms as represented by the following general formula (7).

$$-R^9-CO-O- \qquad (7)$$

(wherein $R^9$ represents an alkylene group of 2 to 10 carbon atoms) Particularly preferred is a polymer of ε-caprolactone.

As a commercial product of said polylactone, TONE polyol (manufactured by Union Carbide), among others, can be mentioned.

The polycarbonate (P) for use as said oligomer component (L) may for example be a polycarbonate obtainable by ring-opening polymerization of an aliphatic carbonate containing 3 to 11 carbon atoms as represented by the following general formula (8).

$$-R^{10}-O-CO-O- \qquad (8)$$

(wherein $R^{10}$ represents an alkylene group of 2 to 10 carbon atoms) Preferred are oligomers of propylene carbonate, tetramethylene carbonate and hexamethylene carbonate.

As a commercial product of the polycarbonate, Nippollan 981 (manufactured by Nippon Polyurethane), among others, can be mentioned.

The polyester copolymer (A) can be produced by the known polymerization procedures. A typical procedure comprises subjecting dimethyl terephthalate, said polyether and an excess of said low molecular weight diol to transesterification reaction under heating at 200° C. in the presence of a catalyst and further to polycondensation reaction under reduced pressure at 240° C. to provide a polyester copolymer (A). The copolymer (A) can also be produced in the like manner using said aliphatic polyester, polylactone, polycarbonate or the like in lieu of said polyether.

The instrinsic viscosity of said polyester copolymer (A) is preferably 0.05 to 1.0, more preferably 0.2 to 0.6. If the instrinsic viscosity is less than 0.05, the block property of the ester elastomer will be decreased to adversely affect the mechanical strength at high temperature. If, conversely, the instrinsic viscosity exceeds 1.0, the poor compatibility of copolymer (A) with hydroxyl-terminated polymer (B) prevents the ester elastomer from attaining a sufficient degree of polymerization, with the result the elastomer will have insufficient strength.

The instrinsic viscosity mentioned above means the viscosity value measured in the solvent o-chlorophenol at 25° C.

The hydroxyl-terminated polymer (B) is a polymer having a glass transition temperature of not higher than 20° C. and a number average molecular weight of 500 to 5000, with the absolute value of difference between the solubility parameter δB of hydroxyl-terminated polymer (B) and the solubility parameter δL of the oligomer component (L), i.e. |δB–δL| of not greater than 0.5.

The hydroxyl-terminated polymer (B) is not particularly restricted as far as it satisfies the above requirements. More particularly, a polyether, aliphatic polyester, polylactone, polycarbonate, polyolefin, polybutadiene, polyisoprene, polyacrylate, polysiloxane, etc. each having hydroxyl groups at both termini can be mentioned. Among them, a polyether (M), aliphatic polyester (N), polylactone (O), or polycarbonate (P) is preferred in view of its high reactivity.

The above-mentioned polyether (M), aliphatic polyester (N), polylactone (O) and polycarbonate (P) includes the same ones as mentioned for the oligomer component (L) hereinabove. It is preferred that the above-mentioned polymer (B) is as same as the oligomer component (L).

If the glass transition temperature of said hydroxyl-terminated polymer (B) exceeds 20° C., the comparatibity of hydroxyl-terminated polymer (B) and polyester copolymer (A) is decreased to prevent the ester elastomer from attaining a sufficient degree of polymerization so that not only the strength of the elastomer will be inadequate but also the flexibility of the elastomer will be insufficient. The glass transition temperature of (B) is preferably not higher than 0° C., more preferably not higher than –20° C.

If the number average molecular weight of said hydroxyl-terminated polymer (B) is less than 500, the flexibility of the ester elastomer will be insufficient. If 5000 is exceeded, the elastomer will be excessively high in crystallinity so that its flexibility in the low temperature region will be poor. The preferred range of said number average weight is 500 to 3000 and the more preferred range is 500 to 1000.

It is necessary that the absolute value of difference between the solubility parameter δB of hydroxyl-terminated polymer (B) and the solubility parameter δL of the oligomer component (L), i.e. |δB–δL|, should be not greater than 0.5. The term "solubility parameter" as used herein means a value found applying solubility parameter of a solvent $[(\Delta E/V)^{1/2}]$ to a high polymer. Thus, $\Delta E$ represents the molar vaporization energy of a solvent but in the case of a polymer, its molecular chain is fragmented into partial chains (segments) having substantially the same volumes as those of solvent molecules to postulate vaporatable units and the $\Delta E$ is calculated by using the molar vaporization energy of each segment. In the above formula, V represents volume and, in this case, the volume of said segment. The solubility parameter is sometimes abbreviated as δ value.

The above solubility parameter serves as an approximate indicator of the compatibility of a solvent and a high polymer, and further between a polymer and another polymer. In the present invention, as the hydroxyl-terminated polymer (B) and oligomer component (L) are selected so as to insure that said |δB–δL| will be 0.5 or less, the compatibility between hydroxyl-terminated polymer (B) and oligomer component (L) and, hence, the compatibility between hydroxyl-terminated polymer (B) and polyester copolymer (A) are improved, with the result that the reaction between them proceeds fast to provide an ester elastomer which is flexible and yet excellent in mechanical strength.

The solubility parameter of a polymer can be determined by the method described in Japanese Society of Polymer Chemistry (ed.): Polymer Data Book (1989, Baifu-kan, p. 592. In accordance with this method, a polymer is immersed in solvents having known solubility parameter δS value and the solubility parameter of the polymer is calculated from the range of δS values of the solvents which dissolve the polymer.

As methods for determining solubility parameters by computation, the method of Small and the method of Hoy are also known. The method of Hoy is described in Journal of the Adhesion Society of Japan, 22 (10), 564, 1986 and J. Paint Technology, 42, 76, 1970. In this method, the solubility parameter δP of a polymer is calculated by means of the computation formula (1)

$$\delta P = \Sigma F/V \quad (1)$$

where ΣF is a sum total of the corresponding values in Table 1 below for each recurring component of the polymer and the basal value given in Table 1, and is expressed in units of $(cal/cm^3)^{1/2}/mol$. In the above formula, V is a molar volume in units of $cm^3/mol$, and from the molecular weight M and specific gravity d of each recurring unit of the polymer, the value of V is calculated by means of the following computation formula (2).

$$V = M/d \quad (2)$$

TABLE 1

| Molar Attraction Constant $[(cal/cm^3)^{1/2} mol^{-1}]$ (Hoy)] | |
|---|---|
| —CH$_3$ | 148.3 |
| —CH$_2$— | 141.5 |
|  | 85.99 |
|  | 32.03 |
|  | 126.54 |
| —CH= | 121.53 |
|  | 84.51 |
| —CH= (aromatic ring) | 117.12 |
| —C= (aromatic ring) | 98.12 |

TABLE 1-continued

Molar Attraction Constant [(cal/cm³)^(1/2)mol^(−1)] (Hoy)]

| | |
|---|---|
| —O— (ether) | 114.98 |
| —O— (epoxy) | 176.20 |
| —CO—O— | 326.58 |
| >CH=O | 262.96 |
| —CHO | 292.64 |
| —CO\O/—CO | 567.29 |
| —OH→ | 225.84 |
| —H(acidic dimer)— | 50.74 |
| OH (aromatic nucleus) | 170.99 |
| NH$_2$ | 226.56 |
| —N— | 61.08 |
| C≡N | 354.56 |
| NCO | 358.66 |
| —S | 209.42 |
| Cl$_2$ | 342.67 |
| Cl (monohydric) | 205.06 |
| Cl (dihydric) | 208.27 |
| Cl (aromatic nucleus) | 161.0 |
| Br | |
| Br (aromatic nucleus) | 205.60 |
| F | 41.33 |
| (increment) | |
| conjugated | 23.26 |
| cis substitution | −7.13 |
| trans substitution | −13.50 |
| four-membered ring | 77.76 |
| five-membered ring | 20.99 |
| six-membered ring | −23.44 |
| ortho-substitution | 9.69 |
| meta-substitution | 6.6 |
| para-substitution | 40.33 |
| (benzene ring) | 22.56 |
| (decalin ring) | 62.5 |
| basal value | 135.1 |

A computation example for poly(tetrabutylene glycol), for instance, is shown below.

M=72.10 d=0.9346

ΣF=141.5×4+114.98+135.1=816.08

V=72.10/0.9346=77.15

δP=816.08/77.15=10.58

The ester elastomer comprising said polyester copolymer (A) and said hydroxyl-terminated polymer (B) which are coupled to each other through the intermediary of said urethane component (C) can be obtained by reacting the polyester copolymer (A) and the hydroxyl-terminated polymer (B) with an isocyanate compound (C').

When the terminal functional group of polyester copolymer (A) is hydroxyl, it is bound by an urethane component (C) of the following general formula (1). When the functional group is carboxyl, it is mainly bound by an urethane component (C) of the following general formula (2).

—O—CO—NH—R$^1$—NH—CO—O—  (1)

—O—CO—NH—R$^2$—NH—CO—  (2)

The above general formulas (1) and (2) show the urethane component (C) derived from the isocyanate compound (C') having difunctional group(s), however it is preferable that the urethane component (C) contains a little amount of a component derived from a isocyanate compound (C') having tri- or polyfunctional group(s).

Referring to the above general formulas (1) and (2), $R^1$ and $R^2$ each represents an alkylene group of 2 to 15 carbon atoms, —C$_6$H$_4$—, —C$_6$H$_4$—CH$_2$—, or —C$_6$H$_4$—CH$_2$—C$_6$H$_4$— (where —C$_6$H$_4$— represents phenylene). $R^1$ and $R^2$ each may be an alkyl-substituted phenylene group or a combination of an alkylene group with a phenylene group. When the terminal group of the polyester copolymer (A) is carboxyl, it is considered that a minor proportion of molecules are bound by the urethane component of general formula (1) as well.

The above isocyanate compound (C') is not particularly restricted in structure as far as it contains two isocyanate groups within the molecule.

The isocyanate compound (C') mentioned above includes aromatic diisocyanates such as 4,4'-diphenylmethane diisocyanate, tolylene diisocyanate, phenylene diisocyanate, naphthalene diisocyanate, etc. and aliphatic diisocyanates such as 1,2-ethylene diisocyanate, 1,3-propylene diisocyanate, 1,4-butane diisocyanate, 1,6-hexamethylene diisocyanate, 1,4-cyclohexane diisocyanate, 1,3-cyclohexane diisocyanate, isophorone diisocyanate, hydrogenated 4,4'-diphenylmethane diisocyanate, etc.

It is preferable that the above-mentioned isocyanate compound (C') comprises a little amount of tri- and polyfunctional compounds, i.e. compounds having 3 or more isocyanate groups. The polyester elastomer resulting from the reaction with a polyisocyanate compound having 3 or more isocyanate groups is greater in molecular weight and gives a higher viscosity at melting state to improve moldability.

When said isocyanate compound (C') is partially replaced with a tri- or polyisocyanate compound, the average isocyanate number which is the total number of isocyanate groups in all the isocyanate compounds divided by the total number of the isocyanate compound is preferably not greater than 2.2. If the average isocyanate number exceeds 2.2, the viscosity at melting state will be too high so that the moldability is rather sacrificed. The above-mentioned isocyanate number of 2.2 corresponds to the use of, for example, a diisocyanate and a triisocyanate in a ratio of 4:1.

As the isocyanate compound having an average isocyanate number of 2 to 2.2, commercial products comprising mixtures of compounds having the different isocyanate number can be used. For example, Millionate MR200 (Product of Nippon Polyurethane Co.) is a mixture of compounds of the following general formula (9) wherein n=0, 1, 2, and more than 2, with an average isocyanate number of 2.8. In this invention, a commercial product of this type can be supplemented with a diisocyanate compound to give an overall average isocyanate number of not greater than 2.2.

OCN—[CH$_2$—C$_6$H$_3$(NCO)]$_n$—C$_6$H$_4$—NCO  (9)

The polyester elastomer of the invention preferably comprises 100 parts by weight of polyester copolymer (A), 50 to 500 parts by weight of hydroxyl-terminated polymer (B), and 10 to 100 parts by weight of urethane component (C).

If the proportion of the hydroxyl-terminated polymer (B) is smaller than 50 parts by weight, the product polyester elastomer may not be sufficiently flexible, while the use of hydroxyl-terminated polymer (B) in excess of 500 parts weight will not provide for sufficient mechanical strength. The preferred range is 100 to 300 parts by weight.

If the proportion of urethane component (C) is smaller than 10 parts by weight, the ester elastomer cannot attain a sufficiently high degree of polymerization but will be low in mechanical strength. On the other hand, if 100 parts by weight is exceeded, the polyester elastomer will be of insufficient flexibility. The preferred range is 30 to 70 parts by weight.

The surface hardness of said ester elastomer is 60 to 90 and preferably 70 to 85. If a surface hardness is lower than 60, no sufficient mechanical strength will be attained. If 90 is exceeded, the ester elastomer will not be sufficiently flexible.

The surface hardness mentioned above can be measured in accordance with JIS K 6301 using Type A Spring at 23° C.

The melting point of said ester elastomer is 170 to 230° C., preferably 180 to 220° C. When the melting point is below 170° C., the mechanical strength at high temperature of the elastomer will be insufficient. If 230° C. is exceeded, the moldability of the composition will be poor.

The melting point mentioned above can be determined by differential scanning calorimetry in terms of the endothermic peak owing to melting of crystals. The measurement is performed with an incremental temperature of 10° C./min. and, as the instrument, T A Instruments' "DSC 2920", for instance, can be used.

The process for producing a polyester elastomer according to the second aspect of the invention comprises melt kneading 100 parts by weight of the polyester copolymer (A) composed of 50 to 95 weight % of the short-chain polyester component (a1) and 50 to 5 weight % of the long-chain polyester component (a2), the latter long-chain polyester component (a2) containing the oligomer component (L) having a glass transition temperature of not higher than 20° C. and a number average molecular weight of 500 to 5000 as a constituent unit, 50 to 500 parts by weight of the hydroxyl-terminated polymer (B) having hydroxyl groups at both terminal ends, polymer B having a glass transition temperature of not higher than 20° C. and a number average molecular weight of 500 to 5000, with the absolute difference $|\delta B - \delta L|$ [wherein $\delta B$ represents the solubility parameter of the hydroxyl-terminated polymer (B) and $\delta L$ represents the solubility parameter of the oligomer component (L) in said long-chain polyester component (a2)] being not greater than 0.5, and 10 to 100 parts by weight of the isocyanate compound (C').

Preferably, the above process is carried out by melt kneading polyester copolymer (A) with polyether as the hydroxyl-terminated polymer (B) in the first place and then adding isocyanate compound (C'). It is still more preferable to melt-knead polyester copolymer (A) with polyether as the hydroxyl-terminated polymer (B) and after a clear solution has been obtained, add the isocyanate compound (C').

If the amount of said hydroxyl-terminated polymer (B) is smaller than 50 parts by weight, the polyester elastomer will have insufficient flexibility. When it exceeds 500 parts by weight, sufficient mechanical strength will not be obtained. A preferred range is 100 to 300 parts by weight.

If the amount of said urethane component (C) is smaller than 10 parts by weight, the ester elastomer will not have a high molecular weight but will be low in mechanical strength.

If said amount is larger than 100 parts by weight, the polyester elastomer will be poor in flexibility. A preferred range is 30 to 70 parts by weight.

The amount of the isocyanate compound (C') is preferably such that the molar concentration [NCO] of isocyanate groups and the molar concentration [OH] of the sum of hydroxyl groups occurring in the polyester copolymer (A), the hydroxyl-terminated polymer (B), and another or other constituents, if any, have the following relation:

$$0.9 < [NCO]/[OH] < 1.2$$

If the ratio [NCO]/[OH] is lower than 0.9 or higher than 1.2, the stoichiometry of the reaction deviates excessively and a decreased molecular weight and insufficient mechanical strength will result.

In cases where an amine compound, which is to be mentioned later herein, is used, the total molar concentration $([OH]+[NH_2]+[NH])$ should be used in lieu of the molar concentration [OH] of hydroxyl groups in the above relation.

The above-mentioned polyester copolymer (A), the hydroxyl-terminated polymer (B) and the isocyanate compound (C') can be subjected to reaction by melt kneading using an extruder. The extrusion temperature is preferably 180 to 260° C., more preferably 200 to 240° C. At an extrusion temperature lower than 180° C., the reaction will be difficult to conduct since the polyester copolymer (A) will not melt, making it impossible to obtain a high molecular weight polymer. At a temperature above 260° C., the polyester copolymer (A) and isocyanate compound (C') tend to decompose, hence a polymer having sufficient strength will be unobtainable.

Said extruder is not particularly restricted. Thus, for example, a single-screw or twin-screw extruder may be used. Among them, a twin-screw extruder with the two screws rotating in the same direction or in opposite directions is preferred because of better agitating/mixing efficiency. A twin-screw extruder with the two screws rotating in the same direction and engaging with each other is more preferred.

By adding a compound having two or more reactive functional groups within the molecule to the above-mentioned polyester copolymer (A), the hydroxyl-terminated polymer (B) and the diisocyanate compound (C') on the occasion of the reaction, it is possible to increase the molecular weight of the resulting elastomer and improve the moldability and bending resistance thereof.

The reactive functional groups mentioned above include epoxy, hydroxyl, and hydrogen groups constituting N—H bond, among others. As compounds having such functional groups, there may be mentioned polyfunctional epoxy compounds, polyfunctional alcohol compounds, amine compounds having one or more amino groups, amine compounds having one or more imino groups, compounds having at least one epoxy group and at least one hydroxyl group within the molecule, and compounds having at least one epoxy group and at least one amino group within the molecule, among others.

The compounds having two or more reactive functional groups such as mentioned above may be used in combination of two or more kinds. In particular, the combined use of a polyfunctional epoxy compound and a polyfunctional amine compound is preferred.

In cases where a compound having two or more reactive functional groups such as mentioned above is used, it is preferred that after melt kneading of the polyester copolymer (A), the hydroxyl-terminated polymer (B) and the diisocyanate compound (C'), said compound having two or more reactive functional groups be added and the whole be melt-kneaded. If, for instance, the four components, namely the polyester copolymer (A), the hydroxyl-terminated polymer (B), the isocyanate compound (C) and epoxy compound, are fed simultaneously for melt kneading, the reaction will proceed heterogeneously due to the differences in reactivity of the polyester copolymer (A), the hydroxyl-terminated polymer (B) and epoxy compound with the isocyanate compound (C), failing to give an elastomer showing sufficient mechanical strength. Similarly, the procedure comprising melt-kneading the polyester copolymer (A), the hydroxyl-terminated polymer (B) and the epoxy compound, then feeding the isocyanate compound (C'), and melt kneading will fail to give an elastomer showing sufficient mechanical strength.

The above-mentioned compound having two or more reactive functional groups is preferably added in an amount of 0.01 to 20 parts by weight per 100 parts by weight of the polyester copolymer (A). At an addition amount below 0.01 part by weight, the obtained polyester elastomer will be unable to acquire a sufficient viscosity at melting state. At an amount exceeding 20 parts by weight, gelation may proceed, resulting in loss of melt fluidity in some instances. A preferred range is 0.1 to 10 parts by weight.

The polyfunctional epoxy compound to be used in the practice of the present invention includes polyphenol type, polyglycidylamine type, alcohol type, ester type, and alicyclic type ones, among others. Specifically, there may be mentioned bisphenol A diglycidyl ether, bisphenol F diglycidyl ether, glycerol polyglycidyl ether, ethylene or polyethylene glycol diglycidyl ether, pentaerythritol polyglycidyl ether, N,N'-diglycidylphenylaniline, N,N,N',N'-tetraglycidyldiaminodiphenylmethane, hydrogenated phthalic acid diglycidyl ester, phthalic acid diglycidyl ester, 3,4-epoxycyclohexylmethyl 3,4-epoxycyclohexanecarboxylate, and the like. As commercial products, there may be mentioned, for example, Nagase Kasei's "Denacol", Ciba-Geigy's "Araldite", and Yuka-Shell-Epoxy's "Epikote". Two or more of these may be used combinedly.

The polyfunctional alcohol compound to be used in the practice of the present invention includes, among others, diols such as ethylene glycol, 1,2-propanediol, 1,3-propanediol, 1,3-butanediol, 1,4-butanediol, neopentyl glycol, 1,5-pentanediol and 1,6-hexanediol, triols such as trimethylolpropane and glycerol and, further, alcohols having four or more hydroxyl groups within the molecule, such as pentaerythritol. Two or more of these may be used combinedly.

The amine compound to be used in the present invention may be any one provided that it has two or more nitrogen-bound hydrogen atoms. As such compound, there may be mentioned compounds having one or more amino groups, compounds having two or more imino groups, compounds having a total of two or more of amino and imino groups combinedly. Specifically, there may be mentioned aniline, ethylenediamine, hexamethylenediamine, phenylenediamine, diaminodiphenylmethane, diaminodiphenyl sulfone, diethylenetriamine, diethylaminopropylamine, and the like. Two or more of these may be used combinedly.

In the practice of the present invention, a catalyst may be used in the step of melt kneading the polyester copolymer (A) and the hydroxyl-terminated polymer (B) with the isocyanate compound (C').

As said catalyst, there may be mentioned, for example, diacyltin (II), tetraacyltin (IV), dibutyltin oxide, dibutyltin dilaurate, dimethyltin maleate, tin dioctanoate, tin tetraacetate, triethyleneamine, diethyleneamine, triethylamine, naphthenic acid metal salts, octylic acid metal salts, triisobutylaluminum, tetrabutyl titanate, calcium acetate, germanium dioxide, antimony trioxide, and the like. These may be used singly or two or more of them may be used in combination.

The above-mentioned ester elastomer may contain a stabilizer. Said stabilizer includes, among others, hindered phenolic antioxidants such as 1,3,5-trimethyl-2,4,6-tris(3,5-di-t-butyl-4-hydroxybenzyl)benzene, and 3,9-bis[2-[3-(3-t-butyl-4-hydroxy-5-methylphenyl)-propionyloxy]-1,1-dimethyl-ethyl]-2,4,8,10-tetraoxaspiro[5.5]undecane; heat stabilizers such as tris(2,4-di-t-butylphenyl)phosphite, trilauryl phosphite, 2-t-butyl-α-(3-t-butyl-4-hydroxyphenyl)-p-cumenylbis(p-nonylphenyl)phosphite, dimyristyl 3,3'-thiodipropionate, distearyl 3,3'-thiodipropionate, pentaerythrityl tetrakis(3-laurylthiopropionate) and ditridecyl 3,3'-thiodipropionate; and the like.

In the process of producing the ester elastomer of the present invention or after the production thereof, an additive or additives selected from among fibers, inorganic fillers, flame retardants, ultraviolet absorbers, antistatic agents, inorganic materials, higher fatty acid salts and the like may be added at amounts at which the practical value of said elastomer will not be impaired.

The fibers mentioned above include, among others, inorganic fibers such as glass fiber, carbon fiber, boron fiber, silicon carbide fiber, alumina fiber, amorphous fiber silicon fiber, titanium fiber, carbon fiber, and organic fibers such as aramid fiber and the like.

The inorganic fillers mentioned above include, among others, calcium carbonate, titanium oxide, mica, talc and the like. The flame retardants mentioned above include, among others, hexabromocyclododecane, tris-(2,3-dichloropropyl) phosphate, pentabromophenyl allyl ether and the like.

The ultraviolet absorbers mentioned above include, among others, p-tert-butylphenyl salicylate, 2-hydroxy-4-methoxybenzophenone, 2-hydroxy-4-methoxy-2'-carboxybenzophenone, 2,4,5-trihydroxybutyrophenone and the like.

The antistatic agents mentioned above include, among others, N,N-bis(hydroxyethyl)alkylamines, alkylarylsulfonates, alkylsulfonates and the like. The inorganic materials mentioned above include, among others, barium sulfate, alumina, silicon oxide and the like. The higher fatty acid salts mentioned above include, among others, sodium stearate, barium stearate, sodium palmitate and the like.

The properties of the ester elastomer of the present invention may further be modified by incorporating another thermoplastic resin and/or a rubber component.

As said thermoplastic resin, there may be mentioned, for example, polyolefins, modified polyolefins, polystyrene, polyvinyl chloride, polyamides, polycarbonates, polysulfones and polyesters.

The rubber component mentioned above includes, among others, natural rubber species, styrene-butadiene copolymers, polybutadiene, polyisoprene, acrylonitrile-butadiene copolymers, ethylene-propylene copolymers (EPM, EPDM), polychloroprene, butyl rubbers, acrylic rubbers, silicone rubbers, urethane rubbers, olefin-based thermoplastic elastomers, styrenic thermoplastic elastomers, vinyl chloride-based thermoplastic elastomers, ester-type thermoplastic elastomers, amide-type thermoplastic elastomers and the like.

The ester elastomer of the present invention can be formed into moldings by molding techniques in general use, such as press molding, extrusion molding, injection molding and blow molding. The molding temperature may vary depending on the melting point of the ester elastomer and on the molding technique employed but suitably lies within the range of 160 to 260° C. If the molding temperature is below 160° C., the ester elastomer will show low fluidity and therefore uniform moldings may not be obtained. At a temperature above 260° C., the ester elastomer will undergo decomposition, failing to give ester elastomer moldings with sufficient strength.

The moldings obtained by using the ester elastomer of the present invention are suitably used as automotive parts, electric or electronic parts, industrial parts, etc. or in sports equipment or sporting goods, medical equipment or products, for instance.

The automotive parts include, among others, boots such as constant velocity joint boots and rack-and-pinion boot; ball joint seals; safety belt parts; bumper fascias; emblems; braids; and the like.

The electric or electronic parts include, among others, wire coverings, gears, rubber switches, membrane switches, tact switches, O rings, and the like.

The industrial parts include, among others, hydraulic hoses, coil tubes, sealing members, packings, V belts, rolls, damping or vibration-reducing materials, shock absorbers, couplings, diaphragms, and the like.

The sporting goods include, among others, shoe soles, balls for ball games, and the like.

The medical goods include, among others, medical tubes, blood transfusion packs, catheters, and the like.

In addition to the above applications, the elastomer can suitably be used also in producing elastic fibers, elastic sheets, composite sheets, and hot melt adhesives, or as a material for preparing alloys with other resins.

The ester elastomer of the present invention can simultaneously satisfy those requirements imposed with respect to flexibility and mechanical strength, in particular mechanical strength at high temperature, which the so-far known ester copolymers cannot meet.

Thus, the ester elastomer according to the third aspect of the present invention is characterized in that it has a surface hardness of 60 to 90 and a compression set of not more than 90% as measured after 72 hours of compression at 120° C.

This ester elastomer has ideal performance characteristics as a thermoplastic elastomer.

Said surface hardness is measured at 23° C. using an A-type spring according to JIS K 6301.

If the surface hardness is lower than 60, the mechanical strength will be poor, hence the durability will be insufficient. If said hardness is above 90, the flexibility will be poor, hence the use as an elastic material will become difficult. The surface hardness is preferably within the range of 80 to 89, more preferably 85 to 89.

If the compression set after 72 hours of compression at 120° C. exceeds 90%, the creep resistance will be low, hence durability problems will arise. In applications where the elasticity of the elastomer is utilized for sealing purposes, for instance, the elastomer, after repeated deformation, will no more show the original elasticity, whereby troubles may arise. It is more preferred that said compression set be not more than 85%.

Preferred examples of the ester elastomer having a surface hardness of 60 to 90 and a compression set of not more than 90% as measured after 72 hours of compression at 120° C. are block copolymers composed of an aromatic polyester and a polyether. Such block copolymers comprising an aromatic polyester and a polyether can be obtained by selecting a polyether as the oligomer component (L) and as the hydroxyl-terminated polymer (B) in the ester elastomer mentioned above.

In addition, it is preferred that the ester elastomer have a melting point of 170 to 230° C. as measured by differential scanning calorimetry. The melting point mentioned above can be determined by differential scanning calorimetry in terms of the endothermic peak owing to melting of crystals. The measurement is performed with an incremental temperature of 10° C./min. and, as the instrument, T A Instruments' "DSC 2920", for instance, can be used.

That said aromatic polyester- and polyether-based block copolymer has a melting point of 170 to 230° C. as measured by differential scanning calorimetry means that the aromatic polyester block chain length is longer as compared with the conventional ones, and this structure is conducive to simultaneous realization of the above-mentioned surface hardness and compression set at 120° C. If the melting point is below 170° C., the aromatic polyester block chain length will be short, allowing the compression set to exceed 90%, hence the physical properties at high temperature will be poor. If the melting point is higher than 230° C., it will be difficult to use the copolymer as a flexible material.

It is preferred that the aromatic polyester in the ester elastomer having a surface hardness of 60 to 90 and a compression set of not more than 90% after 72 hours of compression at 120° C. be polybutylene naphthalate or polyethylene naphthalate. Polyester elastomers containing polybutylene naphthalate or polyethylene naphthalate within their structure are excellent in physical properties at high temperature and satisfy the above-mentioned compression set requirement.

The short-chain polyester component (a1) in the ester elastomer of the present invention serves as a hard segment, and crystals formed by this component form crosslinking sites, while the oligomer component (L) and hydroxyl-terminated polymer (B) serve as soft segments, showing entropy elasticity, whereby the characteristics as an elastomer can be exhibited.

In the so-far known ester elastomers, an increase in soft segment proportion for attaining flexibility unavoidably results in a reduction in hard segment length, hence in a lowered melting point and poor mechanical properties at high temperature. On the contrary, in the present invention, according to which a block copolymer is preliminarily prepared from the short-chain polyester component (a1) and the oligomer component (L)—containing long-chain polyester component (a2) and then it is subjected to chain elongation reaction with the hydroxyl-terminated polymer (B), each of the respective components shows its feature as a block to a high extent, so that a high melting point can be realized and at the same time a polyester elastomer excellent in flexibility and physical properties at high temperature can be provided.

In addition, owing to the presence of the short-chain polyester component (a1) mentioned above, the ester elastomer of the present invention tends to crystallize more easily than the so-far known ester elastomers showing the same degree of flexibility and, as a result, sites of firm crosslinking are formed, providing an elastomer material excellent in mechanical characteristics at high temperature. Furthermore, the presence of the oligomer component (L) and hydroxyl-terminated polymer (B) as block chains contributes to an increase in molecular weight between crosslinking sites. As a result, there is provided an elastomer material rich in flexibility.

EXAMPLES

The following examples are intended to illustrate the present invention in further detail and should by no means be construed as defining the scope of the invention.

Example 1

Using a) 100 parts by weight of dimethyl terephthalate, b) 102 parts by weight of 1,4-butanediol, c) 12 parts by weight of a poly(tetramethylene glycol) with a number average molecular weight of about 1000 [PTHF 1000, manufactured by BASF] as oligomer component (L), 0.3 part by weight of the catalyst tetrabutyl titanate, 0.3 part by weight of the stabilizer 1,3,5-trimethyl-2,4,6-tris(3,5-di-t-butyl-4-hydroxybenzyl)benzene and 0.3 part by weight of tris(2,4-di-t-butylphenyl)phosphite, a transesterification reaction was carried out under nitrogen gas at 200° C. for 3 hours.

The progress of transesterification reaction was monitored by quantitating the methanol distilled off. After this transesterification reaction, the reaction system was heated to 240° C. over 20 minutes and decompressed. The polymerization system reached a vacuum of 2 mmHg or less in 20 minutes. The polycondensation reaction was carried out under the conditions for 20 minutes to provide 120 parts by weight of white polyester copolymer (A). The instrinsic viscosity of this polyester copolymer (A) was 0.20.

Using a twin-screw extruder (Berstorff, L/D=40), 100 parts by weight of the above polyester copolymer (A), 110 parts by weight of c) a poly(tetramethylene glycol) with a number average molecular weight of about 1000 (PTHF 1000, manufactured by BASF) as polymer component (B) and 42 parts by weight of d) 4,4'-diphenylmethane diisocyanate as isocyanate compound (C') were kneaded at 220° C. (residence time 200 seconds) to provide a ester elastomer as pellets.

Examples 2 to 8 and 11 to 19

Using the specific compounds mentioned in Table 2 and Tables 4(a) to 7(a) as the aromatic dicarboxylic acid derivative, low molecular weight diol, oligomer component (L), hydroxyl-terminated polymer (B), and isocyanate compound (C'), respectively, in the proportions indicated in Table 2 and Tables 4(a) to 7(a), and using the transesterification time and polycondensation time shown in Table 2 and Tables 4(a) to 7(a), the procedure of Example 1 was otherwise repeated to provide ester elastomers as pellets.

Comparative Example 1

Using 100 parts by weight of dimethyl terephthalate, 102 parts by weight of 1,4-butanediol, 170 parts by weight of a poly(tetramethylene glycol) with a number average molecular weight of about 1000 [PTHF 100, manufactured by BASF], 0.3 part by weight of the catalyst tetrabutyl titanate, 0.3 part by weight of the stabilizer 1,3,5-trimethyl-2,4,6-tris (3,5-di-t-butyl-4-hydroxybenzyl)benzene and 0.3 part by weight of tris(2,4-di-t-butylphenyl)phosphite, a transesterification reaction was carried out under nitrogen gas at 200° C. for 3 hours.

The progress of transesterification reaction was monitored by quantitating the methanol distilled off. After this transesterification reaction, the reaction system was heated to 240° C. over 20 minutes and decompressed. The polymerization system reached a vacuum of 2 mmHg or less in 20 minutes.

The polycondensation reaction was carried out under the conditions for 6 hours to provide 283 parts by weight of white polyester elastomer.

Comparative Examples 2, 11, 13 and 15

Using the compounds mentioned in Table 3 and Tables 5(a) to 7(a) as the aromatic dicarboxylic acid derivative and low molecular weight diol but no compound corresponding to oligomer component (L), in the proportions indicated in Table 3 and Tables 5(a) to 7(a) and the transesterification time and polycondensation time shown in Table 3 and Tables 5(a) to 7(a), the reaction procedure of Example 1 was otherwise repeated to provide a polyester copolymer (A). When 100 parts by weight of this polyester copolymer, hydroxyl-terminated polymer (B) and isocyanate compound (C) shown in Table 3 and Tables 5(a) to 7(a) were kneaded using a twin-screw extruder (Berstorff, L/D=25) at 220° C. (residence time 200 seconds), no ester elastomer pellets could be obtained.

Comparative Examples 3 to 7

The reaction and treatment procedure of Example 1 was followed in the same manner except that the aromatic dicarboxylic acid derivative, low molecular weight diol, oligomer component (L), hydroxyl-terminated polymer (B) and isocyanate compound (C') respectively specified in Table 3 were used in the proportions specified in Table 3 and that the transesterification time and polycondensation time were set at the values shown in Table 3, to give ester elastomer pellets.

Comparative Example 8

First, a polyester copolymer (A) was prepared by carrying out the reaction in the same manner as in Example 1 except that the same aromatic dicarboxylic acid derivative, low molecular weight diol and oligomer component (L) as used in Example 1 were used in the proportions specified in Table 3 and that the transesterification time and polycondensation time were set at the values shown in Table 3. And, 100 parts by weight of this polyester copolymer (A) and the hydroxyl-terminated polymer (B) and isocyanate compound (C') specified in Table 3 were kneaded together in a twin-screw extruder (Berstorff, L/D=25) at 220° C. (residence time: 200 seconds). No ester elastomer pellets could be obtained, however. On this occasion, $|\delta L - \delta B|$ was equal to 0.59.

Comparative Examples 9, 10, 12 and 14

The reaction and treatment procedure of Example 1 was followed in the same manner except that the aromatic dicarboxylic acid derivative, low molecular weight diol, oligomer component (L), hydroxyl-terminated polymer (B) and isocyanate compound (C') respectively specified in Table 4 and Tables 5(a) to 7(a) were used in the proportions specified in Table 4 and Tables 5(a) to 7(a) and that the transesterification time and polycondensation time were set at the values shown in Table 4 and Tables 5(a) to 7(a) to give ester elastomer pellets.

Example 9

A polyester copolymer (A) (120 parts by weight) was obtained in the same manner as in Example 1 except that 12 parts by weight of poly-1,2-propylene glycol ("Diol 700", product of Mitsui Chemical) with a number average molecular weight of about 700 was used as the oligomer component (L). The polyester copolymer (A) obtained had an intrinsic viscosity of 0.20.

This polyester copolymer (A) (100 parts by weight), 110 parts by weight of poly(tetramethylene glycol) ("PTHF 1000", product of BASF) with a number average molecular weight of about 1,000 and 42 parts by weight of 4,4'-diphenylmethanediisocyanate were kneaded together in a twin-screw extruder (Berstorff, L/D=40) at 220° C. (residence time: 200 seconds) to give ester elastomer pellets.

The δ values of the oligomer component (L) and hydroxyl-terminated polymer (B) were calculated respectively from the following data by the method of Hoy. Poly-1,2-propylene glycol: M=58.08, d=0.9980; Poly (tetramethylene glycol): M=72.10, d=0.9346.

Example 10

A polyester copolymer (A) (120 parts by weight) was prepared in the same manner as in Example 1 except that 12 parts by weight of polylactone ("TONE 0221 HP", product of Union Carbide) with a number average molecular weight of about 1,000 was used as the oligomer component (L). The polyester copolymer (A) obtained had an intrinsic viscosity of 0.21.

This polyester copolymer (A) (100 parts by weight), 110 parts by weight of polylactone ("TONE 0221 HP", product of Union Carbide) with a number average molecular weight of about 1,000 and 42 parts by weight of 4,4'-diphenylmethanediisocyanate were kneaded together in a twin-screw extruder (Berstorff, L/D=40) at 220° C. (residence time: 200 seconds) to give ester elastomer pellets. Polylactone: M=114.14, d=1.15.

The pellets obtained above in Examples 1 to 19 and Comparative Examples 1 to 15 were molded into 2-mm-thick sheets by press molding (press temperature: 230° C.), and the sheets were evaluated as to the items mentioned below. The results are shown in Tables 2 and 3 and Tables 4(b) to 7(b). The intrinsic viscosities of the respective polyester copolymers (A) are also shown in Tables 2 and 3 and Tables 4(b) to 7(b).

(1) Glass Transition Temperature (Tg), Melting Point and Heat of Fusion

The measurements were carried out using a differential scanning calorimeter ("DSC 2920" product of T A Instruments) at a rate of temperature raising of 10° C. per minute.

(2) Surface Hardness (JIS A)

The surface hardness was measured at 23° C. using an A-type spring according to JIS K 6301.

(3) Tensile Modulus of Elasticity (E')

The dynamic viscoelasticity spectrum was measured at 10 Hz while varying the temperature, and the flexibility was evaluated based on the values of E' at room temperature (23° C.) and a high temperature (150° C.).

(4) Compression Set

The compression set was measured at 100° C. and 120° C. and at a compression deformation of 25% according to JIS K 6301, and the creep resistance was evaluated.

(5) Tensile Characteristics

The tensile strength and tensile elongation were evaluated at room temperature (23° C.) for 29 hours according to JIS K 6301.

(6) Viscosity at Melting State

The viscosity at melting state was measured using Toyo Seiki's Capillograph 1B at 220° C. and 128/sec.

TABLE 2

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Polyester copolymer |  |  |  |  |  |  |  |  |
| Aromatic dicarboxylic acid derivative | a 100 | a 100 | a 100 | a 100 | a 100 | a 100 | a 100 | a 100 |
| Low molecular weight diol | b 102 | b 102 | b 102 | b 102 | b 102 | b 102 | b 102 | b 102 |
| Oligomer component (L) | c 12 | c 37 | c 48 | c 28 | c 48 | c 28 | f 28 | f 12 |
| Transestrification reaction time (hr) | 3 | 3 | 3 | 3 | 3 | 3 | 3 | 3 |
| Polycondensation time (min..) | 20 | 20 | 20 | 20 | 20 | 20 | 60 | 20 |
| (a1) in (A) (%) | 90 | 75 | 70 | 80 | 70 | 80 | 80 | 90 |
| Instrinsic viscosity [η] | 0.2 | 0.22 | 0.21 | 0.2 | 0.21 | 0.2 | 0.47 | 0.2 |
| Production weight of (A) | 120 | 148 | 160 | 140 | 160 | 140 | 140 | 120 |
| Polymer (B) | c 110 | c 110 | c 110 | c 110 | e 110 | c 110 | c 110 | c 110 |
| Isocyanate compound | d 42 | d 40 | d 36 | d 42 | d 30 | d 36 | d 42 | d 42 |
| Elastomer |  |  |  |  |  |  |  |  |
| Melting point [° C.] | 205 | 197 | 198 | 201 | 190 | 203 | 211 | 201 |
| Heat of melting (J/g) | 13.1 | 9.8 | 10.7 | 12.1 | 8.9 | 12.2 | 15.2 | 10.1 |
| Surface hardness (JIS A) | 85 | 80 | 81 | 85 | 75 | 86 | 89 | 81 |
| E' 23° C. | 25.2 | 17.2 | 18.9 | 27.1 | 13.8 | 28.9 | 31.9 | 18.2 |
| E' 150° C. | 16.3 | 8.3 | 9.2 | 15.8 | 7.2 | 16.1 | 19.9 | 8.7 |
| Compression set (%) (100° C./120° C.) | 48/82 | 53/84 | 53/84 | 51/83 | 57/87 | 50/86 | 48/82 | 56/83 |
| Tensile strength (kgf/cm²) | 520 | 400 | 450 | 500 | 350 | 500 | 580 | 400 |
| Tensile elongation (%) | 1600 | 2100 | 1840 | 1700 | 2500 | 1650 | 1500 | 1900 |
| Viscosity at melting state (poise) | 11000 | 9000 | 7000 | 8000 | 6000 | 8000 | 9000 | 9000 |
| Instrinsic viscosity [η] | 1.8 | 1.6 | 1.4 | 1.7 | 1.2 | 1.5 | 1.7 | 1.7 |

TABLE 3

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Polyester copolymer | | | | | | | |
| Aromatic dicarboxylic acid derivative | a 100 | 100 | a 100 | a 100 | a 100 | a 100 | a 100 |
| Low molecular weight diol | b 102 | b 102 | b 102 | b 102 | b 102 | b 102 | b 102 |
| Oligomer component (L) | c 170 | — | c 48 | c 48 | c 12 | c 170 | c 48 |
| Transestrification reaction time (hr) | 3 | 3 | 3 | 3 | 3 | 3 | 3 |
| Polycondensation time (min.) | 360 | 20 | 20 | 20 | 10 | 30 | 120 |
| (a1) in (A) (%) | 100 | 100 | 70 | 70 | 90 | 40 | 70 |
| Instrinsic viscosity [η] | (1.5) | 0.20 | 0.21 | 0.21 | 0.03 | 0.35 | 1.20 |
| Production weight of (A) | 283 | 110 | 160 | 160 | 120 | 283 | 160 |
| Polymer (B) | — | c 110 | x 110 | y 110 | c 110 | c 110 | c 110 |
| Isocyanate compound | — | d 42 | d 120 | d 8 | d 36 | d 42 | d 42 |
| Elastomer | | | | | | | |
| Glass transition temperature (° C.) | −39 | not obtained | −36 | 15 | −40 | −45 | not obtained |
| Melting point (° C.) | 155 | | 196 | 195 | 149 | 138 | |
| Heat of melting (J/g) | 9.3 | | 10.7 | 9.9 | 5.2 | 4.3 | |
| Surface hardness (JIS A) | 91 | | 96 | 93 | 73 | 72 | |
| E' 23° C. | 50.8 | | 48.6 | 56 | 7.2 | 6.1 | |
| E' 150° C. | broken | | 37.2 | 33.1 | broken | broken | |
| Compression set (%) (100° C./120° C.) | 98/100 | | 51/86 | 48/97 | 100/100 | 100/100 | |
| Tensile strength (kgf/cm$^2$) | 100 | | 460 | 120 | 280 | 250 | |
| Tensile elongation (%) | 350 | | 700 | 280 | 2500 | 2500 | |
| Viscosity at melting state (poise) | 4000 | | 58000 | 2000 | 4000 | 3500 | |
| Instrinsic viscosity [η] | 1.5 | | 1) | 0.9 | 1.3 | 1.6 | |

1) Since pellet could not be obtained, the value could not be obtained.

TABLE 4(a)

|  | Ex.9 | Ex.10 | Compar.Ex.8 | Ex.11 | Ex.12 | Ex.13 | Compar.Ex.9 |
|---|---|---|---|---|---|---|---|
| Polyester copolymer (A) | | | | | | | |
| Aromatic dicarboxylic acid derivative (weight parts) | a 100 | a 100 | a 100 | k 126 | k 126 | k 126 | k 126 |
| Low molecular weight diol (weight parts) | b 102 | b 102 | b 102 | b 102 | b 102 | n 70 | b 102 |
| Oligomer component (L) (weight parts) | j 12 | h 12 | c 48 | c 48 | c 28 | c 30 | c 190 |
| Transestrification reaction time (hr) | 3 | 1 | 3 | 3 | 3 | 3 | 3 |
| Polycondensation time (min.) | 20 | 10 | 20 | 20 | 20 | 20 | 20 |
| (a1) in (A) (%) | 90 | 90 | 85 | 85 | 94 | 80.5 | 100 |
| Instrinsic viscosity (η) | 0.2 | 0.22 | 0.24 | 0.24 | 0.24 | 0.24 | 0.21 |
| Production amount of (A) | 120 | 120 | 160 | 160 | 140 | 154 | 110 |
| Polymer (B) (weight parts) | c 110 | h 110 | h 110 | c 110 | c 110 | c 110 | — |
| Isocyanate compound (weight parts) | d 42 | d 42 | d 42 | d 42 | d 42 | d 42 | — |
| IσL-σBI | 0.17 | 0 | 0.59 | 0 | 0 | 0 | — |

TABLE 4(b)

Properties of Elastomer

|  | Ex.9 | Ex.10 | Compar.Ex.8 | Ex.11 | Ex.12 | Ex.13 | Compar.Ex.9 |
|---|---|---|---|---|---|---|---|
| Glass transition temperature (° C.) | −48 | −44 | not obtained | −53 | −52 | −44 | −43 |
| Melting point (° C.) | 189 | 191 |  | 210 | 216 | 228 | 148 |
| Heat of melting (J/g) | 13.1 | 9.8 |  | 10.7 | 12.1 | 13.2 | 8.9 |
| Sureface hardness (JIS A) | 83 | 84 |  | 85 | 84 | 82 | 85 |
| E' 23° C. | 19 | 19.5 |  | 20.6 | 20.2 | 19.4 | 20.8 |
| E' 150° C. | 10.8 | 9.5 |  | 17.8 | 17.5 | 18.1 | broken |
| Compression set (%) (100° C./120° C.) | 71/87 | 64/85 |  | 38/76 | 34/74 | 32/74 | 100/100 |
| Tensile strength (kgf/cm²) | 280 | 430 |  | 330 | 360 | 420 | 150 |
| Tensile elongation (%) | 1350 | 1600 |  | 1450 | 1700 | 1800 | 750 |
| Viscosity at melting state (poise) | 5500 | 8000 |  | 40000 | 43000 | * | 2000 |
| Instrinsic viscosity (η) | 1.2 | 1.5 |  | 1.6 | 1.7 | 1.7 | 1.3 |

*cannot be measured (The elastomer did not flow.)

TABLE 5(a)

use of aliphatic polymer as a polyester copolymer (A)

|  |  | Ex. 14 | Ex. 15 | Comp. Ex. 10 | Comp. Ex. 11 |
|---|---|---|---|---|---|
| Polyester copolymer (A) | Aromatic dicarboxylic acid derivative | a 100 | a 100 | a 100 | a 100 |
|  | Low molecular weight diol | b 102 | b 102 | b 102 | b 102 |
|  | Oligomer component (L) | g 48 | g 28 | g 170 | — |
|  | Transestrification reaction time (hr) | 1 | 1 | 1 | 1 |
|  | Polycondensation time (min.) | 20 | 20 | 180 | 20 |
|  | Production amount of (A) | 160 | 140 | 283 | 110 |
|  | (a1) in (A) (%) | 67 | 78 | — | — |
|  | Instrinsic viscosity (η) | 0.2 | 0.21 | (1.5) | 0.21 |
| Polymer (B) |  | g 110 | g 110 | — | g 110 |
| Isocyanate compound |  | d 53 | d 53 | — | d 53 |

TABLE 5(b)

Properties of Elastomer

|  | Ex. 14 | Ex. 15 | Comp. Ex. 10 | Comp. Ex. 11 |
|---|---|---|---|---|
| Glass transition temperature (° C.) | −42 | −41 | −24 | not obtained |
| Melting point (° C.) | 167 | 171 | 132 |  |
| Heat of melting (J/g) | 9.4 | 9.6 | 5.2 |  |
| Sureface hardness (JIS A) | 83 | 87 | 95 |  |
| E' 23° C. | 30.8 | 41.2 | 70.5 |  |
| E' 150° C. | 0.8 | 1.3 | broken |  |
| Compression set (%) (100° C./120° C.) | 78/88 | 77/89 | 100/100 |  |
| Tensile strength (kgf/cm2) | 480 | 490 | 150 |  |
| Tensile elongation (%) | 1500 | 1600 | 800 |  |
| Viscosity at melting state (poise) | 8000 | 8000 | 3000 |  |
| Instrinsic viscosity (η) | 1.6 | 1.6 | 1.5 |  |

TABLE 6(a)

use of Polylactone as a polyester copolymer (A)

|  |  | Ex. 16 | Ex. 17 | Comp. Ex. 12 | Comp. Ex. 13 |
|---|---|---|---|---|---|
| Polyester copolymer (A) | Aromatic dicarboxylic acid derivative | a 100 | a 100 | a 100 | a 100 |
|  | Low molecular weight diol | b 102 | b 102 | b 102 | b 102 |
|  | Oligomer component (L) | h 48 | h 28 | h 170 | — |
|  | Transestrification reaction time (hr) | 1 | 1 | 1 | 1 |
|  | Polycondensation time (min.) | 20 | 20 | 180 | 60 |
|  | Production amount of (A) | 160 | 140 | 283 | 110 |
|  | (a1) in (A) (%) | 67 | 78 | — | — |
|  | Instrinsic viscosity (η) | 0.22 | 0.22 | (1.4) | 0.47 |
| Polymer (B) |  | h 110 | h 110 | — | h 110 |
| Isocyanate compound |  | d 53 | d 36 | — | d 53 |

TABLE 6(b)

Properties of Elastomer

|  | Ex. 16 | Ex. 17 | Comp. Ex. 12 | Comp. Ex. 13 |
|---|---|---|---|---|
| Glass transition temperature (° C.) | −40 | −40 | −23 | not obtained |
| Melting point (° C.) | 170 | 174 | 137 |  |
| Heat of melting (J/g) | 9.5 | 9.7 | 5.5 |  |
| Sureface hardness (JIS A) | 82 | 87 | 94 |  |
| E' 23° C. | 30.1 | 42.5 | 70.1 |  |
| E' 150° C. | 0.6 | 1.4 | broken |  |
| Compression set (%) (100° C./120° C.) | 78/89 | 74/88 | 100/100 |  |
| Tensile strength (kgf/cm²) | 520 | 330 | 170 |  |
| Tensile elongation (%) | 1700 | 1400 | 700 |  |
| Viscosity at melting state (poise) | 9000 | 6500 | 2500 |  |
| Instrinsic viscosity (η) | 1.7 | 1.4 | 1.4 |  |

TABLE 7(a)

use of polycarbonate as a polyester copolymer (A)

|  |  | Ex. 18 | Ex. 19 | Comp. Ex. 14 | Comp. Ex. 15 |
|---|---|---|---|---|---|
| Polyester copolymer (A) | Aromatic dicarboxylic acid derivative | a 100 | a 100 | a 100 | a 100 |
|  | Low molecular weight diol | b 102 | b 102 | b 102 | b 102 |
|  | Oligomer component (L) | i 48 | i 28 | i 170 | — |
|  | Transesterification reaction time (hr) | 1 | 1 | 1 | 1 |
|  | Polycondensation time (min.) | 20 | 20 | 180 | 60 |
|  | Production amount of (A) | 160 | 140 | 283 | 110 |
|  | (a1) in (A) (%) | 67 | 79 | — | — |
|  | Instrinsic viscosity (η) | 0.21 | 0.21 | (1.5) | 0.47 |
| Polymer (B) |  | i 110 | i 110 | — | i 110 |
| Isocyanate compound |  | d 53 | d 36 | — | d 53 |

TABLE 7(b)

Properties of Elastomer

|  | Ex. 18 | Ex. 19 | Comp. Ex. 14 | Comp. Ex. 15 |
|---|---|---|---|---|
| Glass transition temperature (° C.) | −52 | −51 | −29 | not obtained |
| Melting point (° C.) | 175 | 179 | 142 |  |
| Heat of melting (J/g) | 9.8 | 10.1 | 5.7 |  |
| Surface hardness (JIS A) | 83 | 87 | 94 |  |
| E' 23° C. | 31.2 | 42.1 | 72.3 |  |
| E' 150° C. | 0.8 | 1.6 | broken |  |
| Compression set (%) (100° C./120° C.) | 74/89 | 69/88 | 100/100 |  |
| Tensile strength (kgf/cm2) | 470 | 300 | 180 |  |
| Tensile elongation (%) | 1400 | 1300 | 800 |  |
| Viscosity at melting state (poise) | 9000 | 6000 | 3000 |  |
| Instrinsic viscosity (η) | 1.6 | 1.3 | 1.5 |  |

Each alphabet in the above tables represents in the following.
a) Dimethyl terephtalate "DMT", product of Mitsubishi Chemical
b) 1,4-butanediol "1,4-BD", product of Mitsubishi Chemical
c) poly(tetramethylene glycol) with a number average molecular weight of about 1000 and δ value of 10.58 [PTHF 1000, product of BASF]
d) poly(tetramethylene glycol) with a number average molecular weight of about 2000 and δ value of 10.58 [PTHF 2000, product of BASF]
e) poly(tetramethylene glycol) with a number average molecular weight of about 650 and δ value of 10.58 [PTHF 650, product of BASF]
x) poly(tetramethylene glycol) with a number average molecular weight of about 250 and δ value of 10.58 [PTHF 250, product of BASF]
y) poly(tetramethylene glycol) with a number average molecular weight of about 4463 and δ value of 10.58 [PTHF 4500, product of BASF]
g) aliphatic polyester, polybutylene adipate with a number average molecular weight of about 1000 and δ value of 9.92 ("Nippollan 4009", product of Nippon Polyurethane)
h) polylactone, with a number average molecular weight of about 1000 and δ value of 11.17 ("TONE 0220 HP", product of Union Carbide)
i) polycarbonate with a number average molecular weight of about 2000 and δ value of 9.86 [Nippollan 981 (product of Nippon Polyurethane]
j) poly-1,2-propylene glycol ("Diol 700", product of Mitsui Chemical) with a number average molecular weight of about 700 and δ value of 10.75
k) naphthalenedicarboxylic acid "DMN", product of Mitsubishi Chemical
l) isocyanate mixture with the average number of isocyanate groups of 2.03 [isocyanate mixture of polyfunctional isocyanate mixture (Nippon Polyurethane's "Millionate MR200" with an average number of isocyanate groups of 2.8) and 4,4'-diphenylmethanediisocyanate (Nippon Polyurethane's "Millionate MT") in a ratio of 3.75:100]
m) isocyanate mixture with an average number of isocyanate groups of 2.10 [isocyanata mixture of polyfunctional isocyanate mixture (Nippon Polyurethane's "Millionate MR200" with the average number of isocyanate groups of 2.8) and 4,4'-diphenylmethanediisocyanate (Nippon Polyurethane's "Millionate MT") in a ratio of 15:100]
n) ethylene glycol, "EG", product of Mitsubishi Chemical

Examples 20 and 21

Ester elastomer pellets were produced by kneading together 100 parts by weight of the polyester copolymer (A) obtained in Example 1, 110 parts by weight of poly(tetramethylene glycol) ("PTHF 1000", product of BASF) with a number average molecular weight of about 1,000 and 36 parts by weight of a polyfunctional isocyanate mixture having an average number of isocyanate groups as mentioned below in a twin-screw extruder (Berstorff, L/D=40) at 220° C. (residence time: 200 seconds).

Polyfunctional Isocyanate Compounds

Example 20: A polyfunctional isocyanate mixture with an average number of isocyanate groups of 2.8 (Nippon Polyurethane's "Millionate MR200") and 4,4'-diphenylmethanediisocyanate (Nippon Polyurethane's "Millionate MT") were mixed up in a ratio of 3.75:100 so that the average number of isocyanate groups amounted to 2.03.

Example 21: A polyfunctional isocyanate mixture with an average number of isocyanate groups of 2.8 (Nippon Polyurethane's "Millionate MR200") and 4,4'-diphenylmethanediisocyanate (Nippon Polyurethane's "Millionate MT") were mixed up in a ratio of 15:100 so that the average number of isocyanate groups amounted to 2.10.

Example 22 and 23

Ester elastomer pellets were produced by kneading together 100 parts by weight of the polyester copolymer (A) obtained in Example 3, 110 parts by weight of poly(tetramethylene glycol) ("PTHF 1000", product of BASF) with a number average molecular weight of about 1,000, 36 parts by weight of d) 4,4'-diphenylmethanediisocyanate as isocyanate compound (C') and 3 parts by weight of the epoxy compound specified below in a twin-screw extruder (Berstorff, L/D=40) at 220° C. (residence time: 200 seconds).

As regards the raw materials feeding, the polyester copolymer (A) and poly(tetramethylene glycol) were fed through the raw material feeding opening of the extruder, 4,4'-diphenylmethanediisocyanate was fed through the injection opening provided on the fourth cylinder, and the epoxy compound was fed through the injection opening provided on the sixth cylinder.

Epoxy Compound

Example 22: Polyethylene glycol diglycidyl ether, Nagase Kasei's "Denacol EX811", 3 parts by weight;

Example 23: Mixture of 2 parts by weight of, Polyethylene glycol diglycidyl ether, Nagase Kasei's "Denacol EX811" and 1 part by weight of pentaerythritol polyglycidyl ether, Nagase Kasei's "Denacol EX411".

Examples 24 and 25

Ester elastomer pellets were produced by kneading together 100 parts by weight of the polyester copolymer (A) obtained in Example 3, 100 parts by weight of poly(tetramethylene glycol) ("PTHF 1000", product of BASF) with a number average molecular weight of about 1,000, 30 parts by weight of d) 4,4'-diphenylmethanediisocyanate as isocyanate compound (C') and 1 part by weight of the polyfunctional alcohol compound specified below in a twin-screw extruder (Berstorff, L/D=40) at 220° C. (residence time: 200 seconds). As regards the raw materials feeding, the polyester copolymer (A) and poly(tetramethylene glycol) were fed through the raw material feeding opening of the extruder, 4,4'-diphenylmethanediisocyanate was fed through the injection opening provided on the fourth cylinder, and the polyfunctional alcohol compound was fed through the injection opening provided on the sixth cylinder.

Polyfunctional Alcohol Compound

Example 24: 1,4-Butanediol, "1,4-BD", product of Mitsubishi Chemical;

Example 25: Pentaerythritol

Examples 26 and 27

Ester elastomer pellets were produced by kneading together 100 parts by weight of the polyester copolymer (A) obtained in Example 3, 110 parts by weight of poly(tetramethylene glycol) ("PTHF 1000", product of BASF) with a number average molecular weight of about 1,000, 36 parts by weight of d) 4,4'-diphenylmethanediisocyanate as isocyanate compound (C') and 1 part by weight of the amine compound specified below in a twin-screw extruder (Berstorff, L/D=40) at 220° C. (residence time: 200 seconds). As regards the raw materials feeding, the polyester copolymer (A) and poly(tetramethylene glycol) were fed through the raw material feeding opening of the extruder, 4,4'-diphenylmethanediisocyanate was fed through the injection opening provided on the fourth cylinder, and the amine compound was fed through the injection opening provided on the sixth cylinder.

Amine Compound

Example 26: Hexamethylenediamine

Example 27: Diethylenetriamine

Examples 28 and 29

Ester elastomer pellets were produced by kneading together 100 parts by weight of the polyester copolymer (A) obtained in Example 3, 110 parts by weight of poly(tetramethylene glycol) ("PTHF 1000", product of BASF) with a number average molecular weight of about 1,000, 36 parts by weight of 4,4'-diphenylmethanediisocyanate as isocyanate compound (C'), 0.5 part by weight of diaminodiphenylmethane and the epoxy compound specified below in a twin-screw extruder (Berstorff, L/D=40) at 220° C. (residence time: 200 seconds). As regards the raw materials feeding, the polyester copolymer (A) and poly(tetramethylene glycol) were fed through the raw material feeding opening of the extruder, 4,4'-diphenylmethanediisocyanate was fed through the injection opening provided on the fourth cylinder, the amine compound was fed through the injection opening provided on the sixth cylinder, and the epoxy compound was fed through the injection opening provided on the eighth cylinder.

Epoxy Compound

Example 28: Polyethylene glycol diglycidyl ether, "Denacol EX811", product of Nagase Kasei, 3 parts by weight;

Example 29: Pentaerythritol polyglycidyl ether, "Denacol EX411", product of Nagase Kasei, 1 part by weight.

The pellets obtained above in Examples 20 to 29 (proportion of the pellets are shown in Tablv 8(a)) are molded into 2-mm-thick sheets by press molding (press temperature: 230° C.) as in Examples 1 to 19, and the sheets were evaluated as to the items mentioned above under (1) to (6) and below under (7). The results are shown in Table 8(b). The intrinsic viscosities of the respective polyester copolymers (A) are also shown in Table 8(b).

(7) Hydrolysis Resistance

Using a pressure cooker testing machine, each test specimen immersed in water at 120° C. for 72 hours was tested for tensile strength at room temperature according to JIS K 6301, and the hydrolysis resistance was evaluated in terms of tensile strength retention percentage based on the tensile strength before immersion.

TABLE 8(a)

|  | Ex.20 | Ex.21 | Ex.22 | Ex.23 | Ex.24 | Ex.25 | Ex.26 | Ex.27 | Ex.28 | Ex.29 |
|---|---|---|---|---|---|---|---|---|---|---|
| Polyester copolymer (A) | | | | | | | | | | |
| Aromatic dicarboxylic acid derivative | a 100 | a 100 | a 100 | a 100 | a 100 | a 100 | a 100 | a 100 | a 100 | a 100 |
| Low molecular weight diol | b 102 | b 102 | b 102 | b 102 | b 102 | b 102 | b 102 | b 102 | b 102 | b 102 |
| Oligomer component (L) | c 12 | c 12 | c 48 | c 48 | c 48 | c 48 | c 48 | c 48 | c 48 | c 48 |
| Transestrification reaction time (hr) | 3 | 3 | 3 | 3 | 3 | 3 | 3 | 3 | 3 | 3 |
| Polycondensation time (min.) | 20 | 20 | 20 | 20 | 20 | 20 | 20 | 20 | 20 | 20 |
| (a1) in (A) (%) | 90 | 90 | 70 | 70 | 70 | 70 | 70 | 70 | 70 | 70 |
| Instrinsic viscosity (η) | 0.2 | 0.2 | 0.21 | 0.21 | 0.21 | 0.21 | 0.21 | 0.21 | 0.21 | 0.21 |
| Production amount of (A) | 120 | 120 | 160 | 160 | 160 | 160 | 160 | 160 | 160 | 160 |
| Polymer (B) | c 110 | c 110 | c 110 | c 110 | c 100 | c 100 | c 110 | c 110 | c 110 | c 110 |
| Isocyanate compound | l 36 | m 36 | d 36 | d 36 | d 30 | d 30 | d 36 | d 36 | d 36 | d 36 |
| Polyfuctional compound | 0 | 0 | 3 | 3 | 1 | 1 | 1 | 1 | 6.5 | 1.5 |

TABLE 8(b)

| | Ex.20 | Ex.21 | Ex.22 | Ex.23 | Ex.24 | Ex.25 | Ex.26 | Ex.27 | Ex.28 | Ex.29 |
|---|---|---|---|---|---|---|---|---|---|---|
| Properties of Elastomer | | | | | | | | | | |
| Melting point (° C.) | 197 | 192 | 192 | 190 | 198 | 195 | 192 | 190 | 192 | 190 |
| Glass transition temperature (° C.) | −40 | −40 | −40 | −40 | −40 | −40 | −40 | −40 | −40 | −40 |
| Heat of melting (J/g) | 10.4 | 10.2 | 9.2 | 8.9 | 8.6 | 8.5 | 8.9 | 8.8 | 8.8 | 9 |
| Sureface hardness (JIS A) | 85 | 85 | 85 | 85 | 93 | 93 | 85 | 85 | 85 | 85 |
| E' 23° C. | 20.5 | 20.6 | 26.8 | 26.9 | 48.9 | 49.3 | 26.5 | 26.7 | 26.5 | 26.8 |
| E' 150° C. | 11.2 | 11.4 | 14.3 | 14.7 | 37.4 | 37.8 | 14.2 | 14.3 | 14.1 | 14.5 |
| Compression set (%) (100° C./120° C.) | 47/84 | 42/82 | 48/83 | 45/81 | 40/80 | 37/80 | 47/84 | 43/82 | 45/79 | 43/99 |
| Tensile strength (kgf/cm$^2$) | 330 | 360 | 280 | 350 | 330 | 360 | 280 | 330 | 280 | 350 |
| Tensile elongation (%) | 1100 | 1100 | 1200 | 1100 | 1300 | 1200 | 1100 | 1100 | 1200 | 1300 |
| Viscosity at melting state (poise) | 19000 | 23000 | 13000 | 18000 | 18000 | 22000 | 14000 | 20000 | 17000 | 22000 |
| Instrinsic viscosity (η) | 1.9 | 2.1 | 1.9 | 2 | 2 | 2.2 | 2 | 2 | 1.9 | 2.3 |
| Hydrolysis resistance (%) | 68 | 69 | 75 | 80 | 80 | 85 | 73 | 82 | 90 | 92 |

Each alphabet in the above table is same as mentioned hereinbefore.

Comparison of the performance characteristics of the ester elastomers of the Examples with those of the ester elastomers of the Comparative Examples reveals (1) that the ester elastomers of the Examples are lower in surface hardness and, in spite of this, show a higher level of heat of fusion resulting from melting of crystals and (2) that the ester elastomers of the Examples are higher in melting point, therefor it is estimated that crystals of the short-chain polyester component of the ester elastomers of the Examples be firm and strong. Furthermore, since the ester elastomers of the Examples are lower in tensile modulus of elasticity (E'), it is estimated that the molecular weight between crosslinking site is large in the ester elastomers of the Examples. As a result, ester elastomers which are high in block feature and which are flexible and creep resistant at high temperature, namely showing a low level of compression set at high temperature, are considered to have been obtained in the Examples mentioned above.

INDUSTRIAL APPLICABILITY

The ester elastomer of the invention, which is constituted as mentioned above, is an ester elastomer whose short chain polyester component is high in block feature; therefore, it is excellent in flexibility and mechanical characteristics at high temperature, in particular in creep resistance at high temperature.

Said ester elastomer can readily be produced by the production method of the present invention using an extruder or the like.

What is claimed is:

1. An ester elastomer which comprises a block copolymer comprising a polyester copolymer (A) and a hydroxyl-terminated polymer (B) which are coupled to each other through the intermediary of an urethane component (C) containing a group of general formula (1)

$$—O—CO—NH—R^1—NH—CO—O— \quad (1)$$

(wherein $R^1$ represents an alkylene group containing 2 to 15 carbon atoms, $—C_6H_4—$, $—C_6H_4—CH_2—$, $—C_6H_4—CH_2—C_6H_4—$ (wherein $—C_6H_4—$ represents phenylene)) and/or a group of general formula (2);

$$—O—CO—NH—R^2—NH—CO— \quad (2)$$

(wherein $R^2$ represents an alkylene group containing 2 to 15 carbon atoms, $—C_6H_4—$, $—C_6H_4—CH_2—$ or $—C_6H_4—CH_2—C_6H_4—$ (wherein $—C_6H_4—$ represents phenylene)), the polyester copolymer (A) comprising 70 to 95 weight % of a short-chain polyester component (a1) having a group of general formula (3);

$$—CO—R^3—CO—O—R^4—O— \quad (3)$$

(wherein $R^3$ represents a bivalent aromatic hydrocarbon group containing 6 to 12 carbon atoms; $R^4$ represents an alkylene group containing 2 to 8 carbon atoms) as a recurring unit and 30 to 5 weight % of a long-chain polyester component (a2) having a group of general formula (4);

$$—CO—R^5—CO—O—L— \quad (4)$$

(wherein $R^5$ represents a bivalent aromatic hydrocarbon group containing 6 to 12 carbon atoms; L represents an oligomer component (L) having a glass transition temperature of not higher than 20° C. and a number average molecular weight of 500 to 5000) as a recurring unit, the hydroxyl-terminated polymer (B) having a glass transition temperature of not higher than 20° C. and a number average molecular weight of 500 to 5000, and the absolute difference |δB−δL|, where δB represents the solubility parameter determined by the method of Hoy of the hydroxyl terminated polymer (B) and δL represents the solubility parameter determined by the method of Hoy of the oligomer component (L) of the long-chain polyester component (a2) being not greater than 0.5, wherein the block copolymer is constituted by 100 to 500 parts by weight of the hydroxyl-terminated polymer (B) and 30 to 70 parts by weight of the urethane component (C) based on 100 parts by weight of the polyester copolymer (A).

2. The ester elastomer according to claim 1 wherein each of the hydroxyl-terminated polymer (B) and the oligomer component (L) of the long-chain polyester component (a2) is a polyether (M) comprising a group of the following general formula (5);

—R⁶—O— (5)

(wherein R⁶ represents an alkylene group of 2 to 10 carbon atoms) as a recurring unit.

3. The ester elastomer according to claim 1 wherein each of the hydroxyl-terminated polymer (B) and the oligomer component (L) of long-chain polyester component (a2) is an aliphatic polyester (N) comprising a group of the following general formula (6);

—R⁷—O—CO—R⁸—CO—O— (6)

(wherein R⁷ and R⁸ each represents an alkylene group of 2 to 10 carbon atoms) as a recurring unit.

4. The ester elastomer according to claim 1 wherein each of the hydroxyl-terminated polymer (B) and the oligomer component (L) of long-chain polyester component (a2) is a polylactone (O) comprising a group of the following general formula (7);

—R⁹—CO—O— (7)

(wherein R⁹ represents an alkylene group of 2 to 10 carbon atoms) as a recurring unit.

5. The ester elastomer according to claim 1 wherein each of the hydroxyl-terminated polymer (B) and the oligomer component (L) of long-chain polyester component (a2) is a polycarbonate (P) comprising a group of the following general formula (8);

—R¹⁰—O—CO—O (8)

(wherein R¹⁰ represents an alkylene group of 2 to 10 carbon atoms) as a recurring unit.

6. The ester elastomer according to claim 1 wherein the polyester copolymer (A) has an instrinsic viscosity of 0.05 to 1.0.

7. The ester elastomer according to claim 1 wherein the hydroxyl-terminated polymer (B) has a number average molecular weight of 500 to 3000.

8. The ester elastomer according to claim 1 wherein the short-chain polyester component (a1) of polyester copolymer (A) is poly(butylene terephthalate).

9. The ester elastomer according to claim 1 wherein the short-chain polyester component (a1) of polyester copolymer (A) is poly(butylene naphthalate).

10. The ester elastomer according to any one of claims 1 to 7 wherein the short-chain polyester component (a1) of polyester copolymer (A) is poly(ethylene naphthalate).

11. An ester elastomer according to claim 1,
which has a surface hardness of 60 to 90 and a 72-hour compressive set at 120° C. of not greater than 90%.

12. The ester elastomer according to claim 11,
which has a melting point of 170 to 230° C. as determined by differential scanning calorimetry.

13. A process for producing the ester elastomer according to claim 1 which comprises melt kneading 100 parts by weight of a polyester copolymer (A) comprising 70 to 95 weight % of the short-chain polyester unit (a1) and 30 to 5 weight % of the long-chain polyester unit (a2) containing an oligomer component (L) having a glass transition temperature of not higher than 20° C. and a number average molecular weight of 500 to 5000, 100 to 500 parts by weight of a hydroxyl-terminated polymer (B) having a glass transition temperature of not higher than 20° C. and a number average molecular weight of 500 to 5000, the absolute difference |δB−δL| being not greater than 0.5, and 30 to 70 parts by weight of an isocyanate compound (C').

14. The process for producing an ester elastomer according to claim 13 wherein the isocyanate compound (C') comprises a tri- or polyfunctional isocyanate compound and its average isocyanate group number is 2 to 2.2.

15. The process for producing an ester elastomer according to claim 13 which comprises melt kneading 100 parts by weight of the polyester copolymer (A), 100 to 500 parts by weight of the hydroxyl-terminated polymer (B), 30 to 70 parts by weight of the isocyanate compound (C'), and 0.01 to 20 parts by weight of a polyfunctional epoxy compound.

16. The process for producing an ester elastomer according to claim 13 which comprises melt kneading 100 parts by weight of the polyester copolymer (A), 100 to 500 parts by weight of the hydroxyl-terminated polymer (B), 30 to 70 parts by weight of the isocyanate compound (C'), and 0.01 to 20 parts by weight of a polyhydric alcohol compound.

17. The process for producing an ester elastomer according to claim 13 which comprises melt kneading 100 parts by weight of the polyester copolymer (A), 100 to 500 parts by weight of the hydroxyl-terminated polymer (B), 30 to 70 parts by weight of the isocyanate compound (C'), and 0.01 to 20 parts by weight of an amine compound having two or more hydrogen atoms bound to nitrogen.

18. The process for producing an ester elastomer according to claim 13 which comprises melt kneading 100 parts by weight of the polyester copolymer (A), 100 to 500 parts by weight of the hydroxyl-terminated polymer (B), 30 to 70 parts by weight of the isocyanate compound (C'), and a combined total of 0.01 to 20 parts by weight of a polyfunctional epoxy compound and an amine compound containing two or more hydrogen atoms bound to nitrogen.

* * * * *